Sept. 22, 1959 R. E. BUCK ET AL 2,905,477
CHUCK
Filed Nov. 13, 1956 4 Sheets-Sheet 1

INVENTORS
RUSSELL E. BUCK
JAMES R. BUCK
BY
Woodhams Blanchard & Flynn
ATTORNEYS

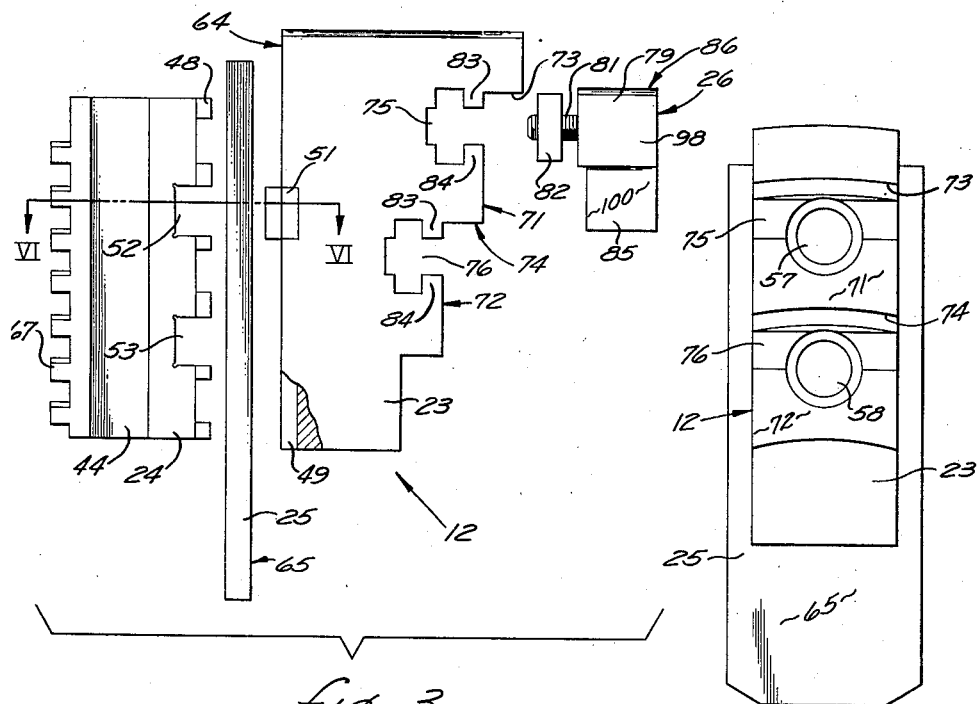
fig. 3
fig. 4
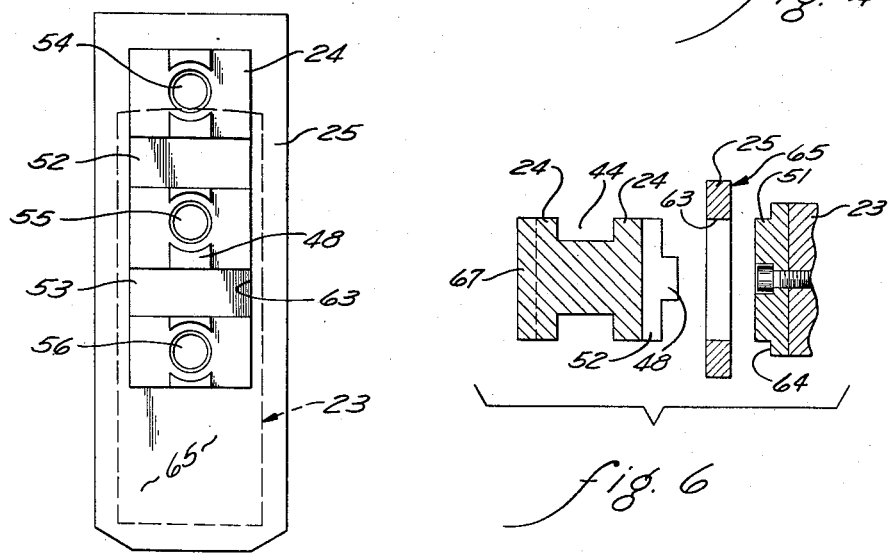
fig. 5
fig. 6
INVENTORS
RUSSELL E. BUCK
JAMES R. BUCK
BY
Woodhams Blanchard & Flynn
ATTORNEYS Sept. 22, 1959  R. E. BUCK ET AL  2,905,477
CHUCK Filed Nov. 13, 1956  4 Sheets-Sheet 3

INVENTOR.
RUSSELL E. BUCK
JAMES R. BUCK
BY
Woodhams Blanchard & Flynn
ATTORNEYS

Sept. 22, 1959   R. E. BUCK ET AL   2,905,477
CHUCK
Filed Nov. 13, 1956   4 Sheets-Sheet 4

INVENTORS.
RUSSELL E. BUCK
JAMES R. BUCK
BY
Woodhams Blanchard & Flynn
ATTORNEYS United States Patent Office 2,905,477
Patented Sept. 22, 1959

2,905,477
CHUCK

Russell E. Buck, Scotts, and James R. Buck, Richland Township, Kalamazoo County, Mich., assignors to Buck Tool Company, Kalamazoo, Mich., a corporation of Michigan Application November 13, 1956, Serial No. 621,938

4 Claims. (Cl. 279—123)

This invention relates to a chuck and particularly to a type of chuck having circumferentially adjustable elements mounted upon radially adjustable chuck jaws for supporting a gear by engaging the teeth thereof. It further relates to a chuck whose working parts are sufficiently shielded that grinding dust and/or other waste products of a metal working operation will be prevented from entering into the interior of the chuck body and damaging the movable members contained therein.

In a gear making operation, it is conventional practice first to provide an opening in the blank from which the gear is to be made and then to hold the blank by means entering within said opening while the teeth are cut. This is satisfactory for most requirements. However, in gears requiring a high degree of precision, such as gears used in aircraft engines, it is desirable to provide a further finishing operation in which recognition is made of the fact that the gear cutting equipment is not always capable of operating in precise relationship to the center upon which the blank is held. Accordingly, there is sometimes a slight eccentricity, such as of the order of 0.002 of an inch, between the center of the pitch circle of the gear and the center of the opening within the gear blank. Since this opening is also the opening through which the shaft is eventually received, if it is eccentric to the pitch circle of the gear the gear will be noisy and subject to excessive wear. Thus, in order to insure a quiet running gear and one which will be subject to minimum wear, it is desirable to grind the central opening after the teeth are cut into more nearly exact concentricity with the actual pitch circle of the gear.

It has been suggested that such operation might be carried out by engaging the gear at the peripheral surfaces of the teeth, but this does not allow for the possibility that the pitch circle, as actually cut, is not exactly concentric with the periphery of the blank from which the gear has been made. Thus, if one is to be certain that the central opening of the gear is ground concentric with the pitch circle itself, it is necessary to provide means by which the gear can be engaged with precise relation to the pitch circle and completely independent of any other structural feature thereof.

Previous efforts to solve this problem have brought forth toothed devices pivotally affixed onto chuck jaws, said toothed devices being arranged for engaging the gear upon which an operation, as aforesaid, is to be performed. Said toothed devices engage the teeth of the gear on the pitch line of the gear in the thought that by so engaging the gear the pitch line will be definitely located and can be made concentric to the tool by which the opening is to be corrected. This is satisfactory where the toothed devices are made for a given size of gear, but where an operation of this type is to be performed upon gears of a variety of sizes, and having a variety of sizes of teeth, such a device becomes impracticable. This impracticality follows primarily from the fact that present toothed devices are pivoted upon an axis which is circumferentially fixed with respect to the chuck. Thus, when the device is accommodated to a gear of size different from that which said toothed devices are expressly designed, a line from the point of pivoting of said toothed device through the center of its gear engaging portion often lies at an angle to the radius of the gear being engaged thereby. This results in the toothed device failing to engage the gear teeth exactly on the pitch circle therethrough and thus it is impossible for the operator to know the exact location of the circle to which he is making the central opening concentric. Therefore, while these devices of the prior art, i.e., where the gear is engaged by toothed devices extending between the gear teeth, are a major improvement over mere chucking of the gear by its periphery, there is still a substantial lack of accuracy incident to this method and it is not possible for one operating according to the best known previous practice to state with certainty that the central opening of the gear can be corrected with exact and definite reference to the pitch circle of the gear.

A further problem, which is particularly serious with chucks handling articles where the work is to be done near the center thereof, such as the further grinding of the central opening of the gear, but is applicable to some extent to any chuck, is the damage done to the internal parts of the chuck by the entry thereinto of grinding dust or other waste products of the working operation. It is therefore desirable to provide a chuck construction in which the internal parts are completely enclosed and protected from such waste products.

Accordingly, a principal object of the invention is the provision of a device for positively engaging a gear and rotating same about the center of its pitch circle, such engagement being effected so that a machine operation can be performed upon a substantial portion of said gear without interference by said device.

A further object of this invention is the provision of a universal chuck, having an adapter means for accurately centering the rotational axis of the chuck, and structure on the chuck jaws whereby a gear, which is engaged by such structure, will automatically be held with its pitch circle centered on said rotational axis.

A further object of this invention is the provision of a gear centering apparatus, as aforesaid, which is easy to operate, which is sturdy in structure, which is positive in action, and which accomplishes the desired results with extreme accuracy.

A further object of this invention is the provision of a universal chuck wherein the jaw actuating mechanism is substantially totally enclosed and, particularly, wherein access to the jaw guide ways from the radially innner ends thereof and the axial side of the chuck adjacent said jaws is completely blocked.

A further object of this invention is the provision of a universal chuck having structure for totally enclosing the axial end of said chuck adjacent to the jaws thereof, and wherein the chuck jaws are each fabricated from two releasably securable components for the purpose of increasing the radial adjustability of the chuck, while maintaining the total enclosure feature.

Other objects and purposes of this invention will become apparent to persons familiar with this type of equipment upon reading the following specification and examining the accompanying drawings, in which:

Figure 3 is an exploded, side elevational view of a jaw assembly.

Figure 4 is an end view of a chuck jaw,

Figure 5 is an end view of said jaw, similar to that shown in Figure 4, with the outer component of said jaw shown in broken lines, and in its inner position.

Figure 6 is a sectional view taken along the line VI—VI of Figure 3.

Figure 1:
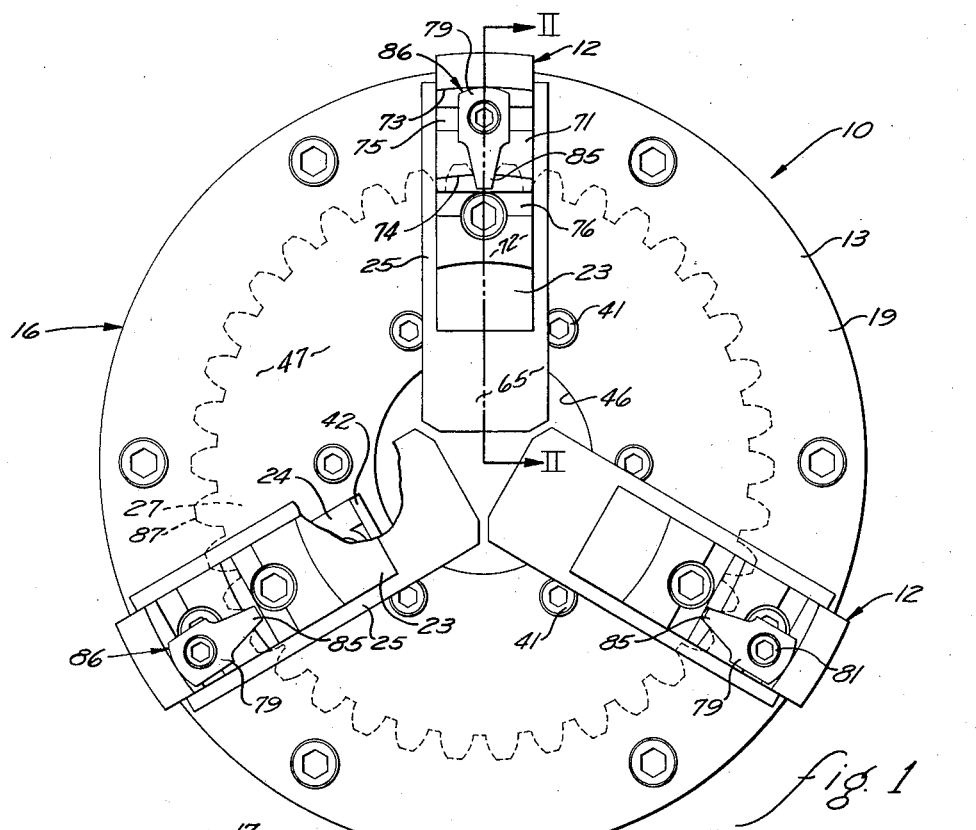
Figure 1 is an end elevational view of a chuck embodying the invention, as viewed from the jaw end thereof with parts partially broken away, and showing the gear which the chuck is holding in broken lines.

For the purpose of convenience of description, the term "front" will have reference to that axial end of the chuck upon which the jaws thereof are mounted, as appearing in Figure 1. The term "rear" will have reference to the opposite axial end of said chuck. In a similar manner, the terms "front," "rear," and derivatives thereof, will have reference to parts, such as the chuck jaws, associated with said chuck. The terms "inner," "outer," and derivatives thereof, will have reference to the geometric center of said chuck and parts associated therewith.

*General description*

Figure 2:
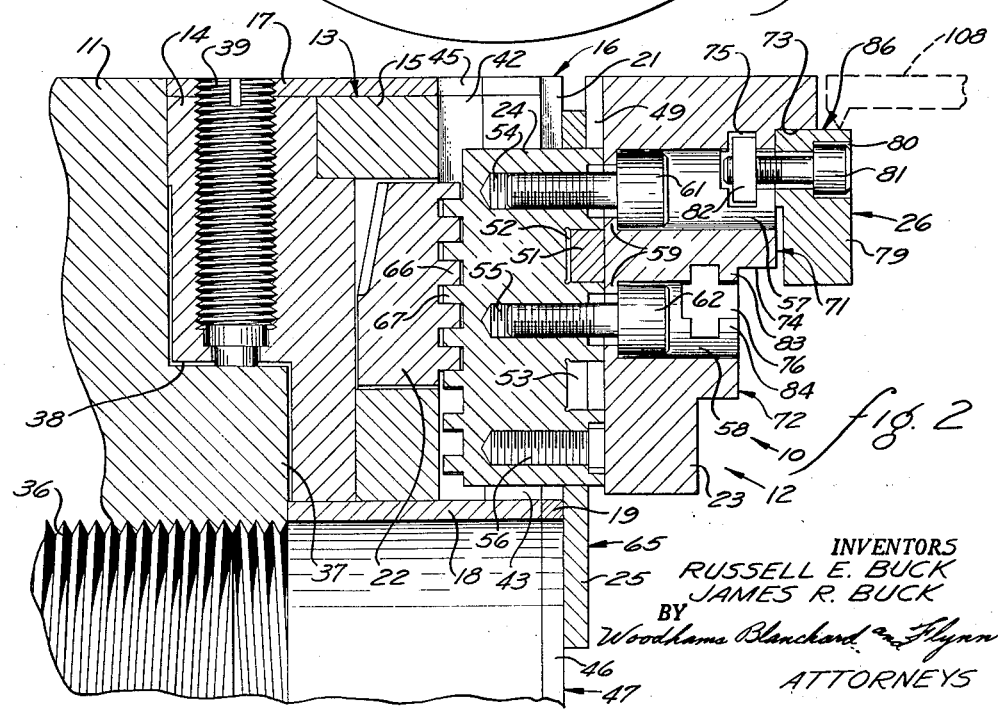
Figure 2 is a sectional view taken along the line II—II of Figure 1.

As shown in Figures 1 and 2, the invention is characterized by a universal chuck 10, having a mounting adapter 11, which may be identical to the mounting adapter described and disclosed in our Patent No. 2,639,157, whereby work carried by the jaws 12 of said chuck can be accurately centered upon the rotational axis thereof. The chuck body 13, which includes the base member 14 and cap member 15, is substantially embraced along its front surface and its radially inner and outer surfaces by a casing 16, which is comprised of an outer cylinder 17, an inner sleeve 18, and a flat ring 19, which extends between the front axial ends of said cylinder and sleeve.

Figure 8:
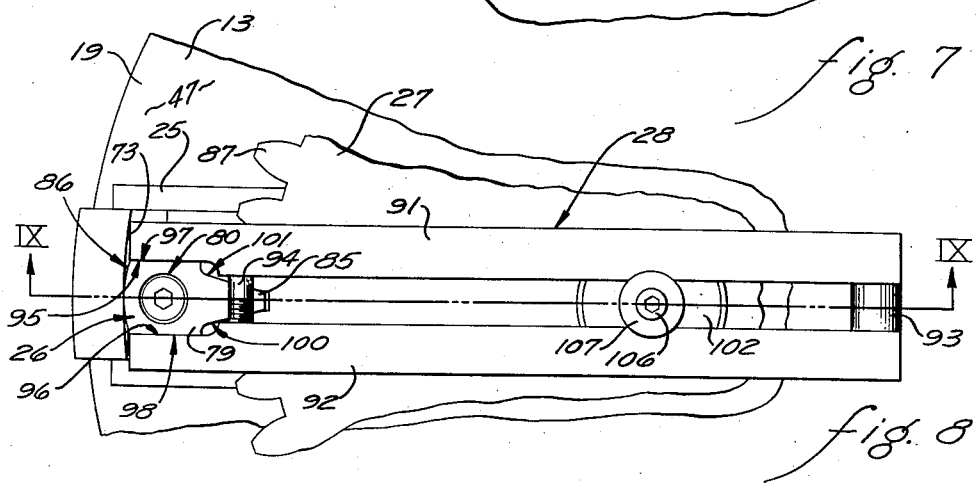
Figure 8 is a fragmentary view of Figure 1 and includes a positioning device on the gear engaging element shown therein.

The jaws 12 (Figures 2 and 3) extend into elongated openings 21 in the face of the chuck 10, where their toothed, rearward ends are engaged by a spiral gear member 22, whereby said jaws are moved radially of the chuck body 13 in a substantially conventional manner. The jaws 12, in this particular embodiment, each have front and rear components 23 and 24, respectively, which are adjustable lengthwise of each other and radially of the chuck body 13, when disposed in the openings 21. The rear component 24 of each jaw 12 is snugly received through an opening in a shield plate 25, which is held against the front ring 19 by the front component 23 of the jaw 12. A work engaging element 26 is adjustably supported upon the front component 23 of each jaw 12, for the purpose of engaging and supporting a gear 27, while an operation is being performed thereon. An alignment tool 28 (Figures 8 and 9) is provided for adjustment of the gear engaging elements 26 with respect to said gear 27 and circumferentially of the chuck 10 so that the pitch line of the gear can be centered upon the rotational axis of the chuck 10 when said gear is snugly engaged and supported by said gear engaging elements.

Figure 10:
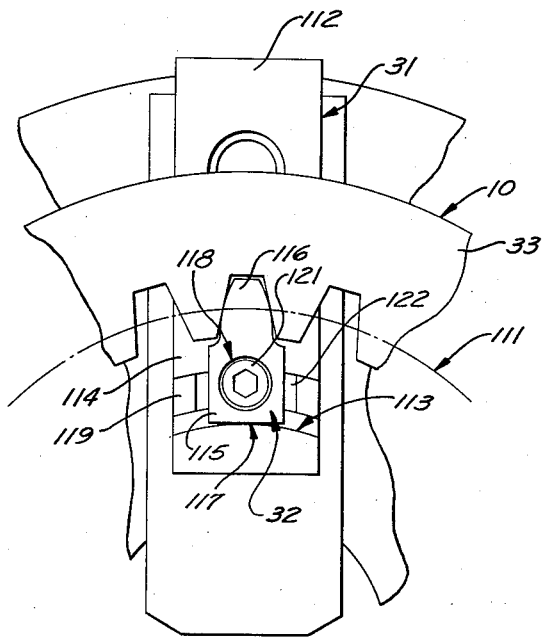
Figure 10 is a fragmentary, end elevational view of a chuck characterizing the invention and adapted for operation with a ring gear.
Figure 11:
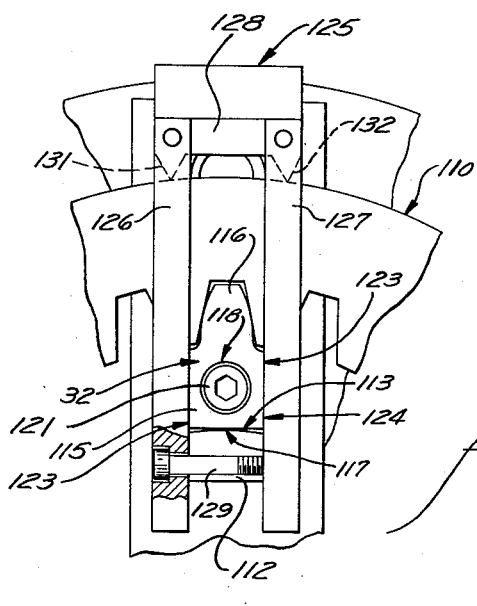
Figure 11 shows a fragment of Figure 10, including a device for aligning the gear engaging element therein.

Figures 10 and 11 disclose modified jaws 31 and modified gear engaging elements 32 therefor, whereby ring gears 33 can be mounted upon and supported by an otherwise conventional universal chuck 10.

*Detailed Construction*

As indicated particularly in Figure 2, the chuck body 13, which comprises the base member 14, cap member 15 and the jaw actuating mechanism therewithin including the spiral gear member 22 for effecting radial movement of the jaws 12, may be substantially identical to the corresponding structure disclosed in our Patent No. 2,639,157. Likewise, the mounting adapter 11 is supported upon a spindle 36 and has a central hub 37, which is extendable into a recess 38 in the base member 14 for engagement by radially disposed screw means 39 in substantially the same manner as discussed and described in detail in our aforementioned patent. Thus, a detailed description of these parts has been omitted from this disclosure.

The cap member 15 (Figure 2), which is secured to the base member 14 by means of the bolts 41, has a plurality, here three, of radially disposed jaw guide ways 42, which are uniformly located around said cap member. Said guide ways open through both the radially inner and outer sides of said cap member. The side walls of each guide way 42 are provided with opposing guide rails 43, which are slidably receivable into guide grooves 44 in the corresponding side walls of the rear component 24 of each jaw 12. The inter-engagement of said rails and grooves prevents displacement of the rear components 24 from within the jaw guide ways 42 in a direction axial of the chuck body 13, but permits radial, sliding movement of said jaws in a substantially conventional manner. The inner end of the guide way 42 is closed by the inner sleeve 18 of the casing 16.

The front ring 19 (Figure 2) of said casing 16 has an elongated opening 21 adjacent to, and aligned with, each said guide way 42, thereby permitting extension of the rear component 24 through said front ring 19. The outer cylinder 17 is provided with a jaw opening 45, which preferably corresponds to the cross-sectional contour of the guide way 42, thereby permitting the jaw 12 to move outwardly through said outer cylinder 17. The elongated jaw openings 21 in the front ring 19 extend from near the central opening 46 in said ring through the outer edge thereof and, accordingly, in alignment with the jaw opening 45.

The front side of the rear component 24 (Figure 2) extends slightly beyond the front surface 47 of the front ring 19 and has an elongated ridge 48 (Figure 6) extending lengthwise of, and frontwardly from, its front surface. The front component 23 has a groove 49 (Figures 2 and 3), into which the ridge 48 is snugly, but slidably, receivable. The front component 23 of each jaw 12 has a positioning bar 51 (Figures 2 and 6), which extends crosswise of the lengthwise extent of the rear surface thereof. The front surface of the rear component 24 is provided with a plurality, such as two in this embodiment, spaced grooves 52 and 53, into which said positioning bar 51 is snugly, but slidably, receivable when the ridge 48 is disposed within the groove 49. The rear component 24 is provided with three uniformly spaced, tapped openings 54, 55 and 56 located, respectively, outwardly of, inwardly of, and between, the grooves 52 and 53. The front component 23 is provided with a pair of bolt openings 57 and 58, having shoulders 59 near their rearward ends, and spaced from each other a distance substantially equal to the spacing between adjacent tapped openings 54, 55 and 56. Bolts 61 and 62 are disposed within the openings 57 and 58 for simultaneous, threaded engagement with either the tapped openings 54 and 55 or the tapped openings 55 and 56, depending upon the desired location of the front component 23 with respect to the rear component 24. Thus, by removing the bolts 61 and 62, the front component 23 can be adjusted radially with respect to the rear component 24 a distance equal to the centerline distance between the bolt openings 57 and 58. It will be seen that this arrangement adds substantially to the range of the chuck by increasing the effective distance of the jaw movement substantially beyond the movement of the rear component 24.

The shield plate 25 is, in this particular embodiment, relatively flat and substantially rectangular, and is provided with a symmetrical, elongated and rectangular jaw opening 63 (Figures 5 and 6), through which the front portion of the rear component 24 is snugly and slidably receivable, as shown in Figure 2. The front component 23 is both wider and longer than the rear component 24.

Thus, said front component has a surface 64 opposed to, and engageable with, the front surface on the shield plate 25 on both lateral sides of the jaw opening 63 therein. As shown in Figures 4 and 5, the front component 23 overlies both radial ends of the jaw opening 63 when it is in its radially outer position with respect to the rear component 24, but overlies only the radially inner end of the opening 63 when in its inner position. In a similar manner, the radially outward portion of the jaw guide ways 42 will be exposed from the front end of the chuck, as well as from the radially outer portion of the chuck, when both the front and rear components of the jaws are disposed in their radially innermost positions with respect to the rear component 24 as indicated in Figure 2. However, no harm results from this exposure because the critical area with respect to the exposure problem is the inner ends of the jaw guide ways 42, where chips, if they become lodged within such inner ends, are thrown by centrifugal force between the teeth 66 on the spiral gear member 22 and the teeth 67 on the rear component 24, which are engaged therewith.

The front and rear components 23 and 24, the jaw guide ways 42, and the shield plate 25 are so arranged and constructed that said shield plate 25 will be held snugly, but slidably, against the front surface 47 of the front ring 19 by the front component 23 when the rear component 24 is within a guide way 42, and the front component is secured to the front surface thereof by means of the bolts 61 and 62, in either of its two alternate positions.

The front component 23 (Figures 2, 3 and 4) is provided with a plurality of axial surfaces arranged at gradually increasing, or decreasing, distances from, and parallel with, the front surface 47 of the ring 19. In this particular embodiment, the adjacent axial surfaces 71 and 72 are located adjacent to, and inwardly of, the arcuate, radial surfaces 73 and 74, respectively. The radius of the radial surfaces 73 and 74 is advantageously approximately equal to the average radial distance between said surfaces 73 and 74 and the rotational axis of the chuck 10 for the various radial positions of the front component 23 with respect to said rotational axis. Substantially identical arcuate and undercut slots 75 and 76 are provided in the axial surfaces 71 and 72, respectively, transversely of said front component 23 near to, but spaced from, the corresponding radial surfaces 73 and 74, respectively, and concentric therewith.

Figure 7:
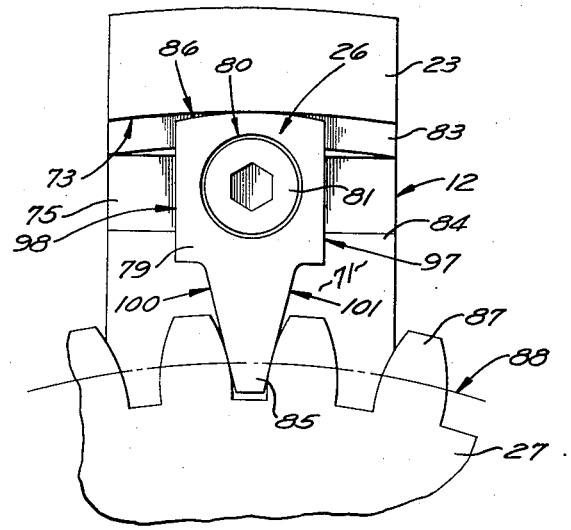
Figure 7 is an enlarged fragment of Figure 1.
Figure 9:
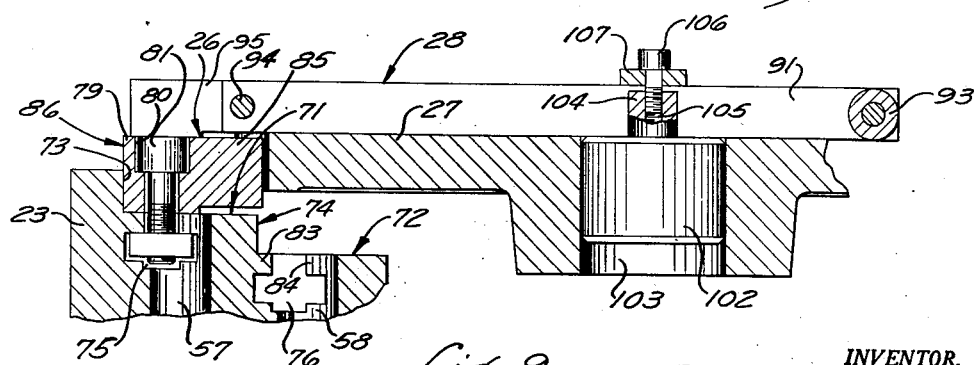
Figure 9 is a sectional view taken along the line IX—IX of Figure 8.

Each gear engaging element 26 (Figures 2, 3 and 7) is comprised of an engaging head 79, having a bolt opening 80 therethrough, through which an anchor bolt 81 is receivable for threadedly engaging an anchor nut 82 slidably disposed within either of the slots 75 or 76. The shoulders 83 and 84 in either of the slots 75 and 76 are clamped between the nut 82 and engaging head 79, as shown in Figures 2 and 9, when the bolt 81 is tightened in position. The engaging head 79, which has a tapered, or wedge-shaped, extension 85 radially converging with respect to the axis of the bolt opening 80, has an arcuate surface 86 on the opposite side thereof from said extension 85. Said arcuate surface 86 is engageable with, and has a substantially smaller radius of curvature than, the corresponding arcuate, radial surfaces 73 and 74. Said arcuate surface 86 is engageable with the corresponding radial surface 73 or 74 when the head 79 is secured by a nut 82 within the undercut slots 75 or 76, respectively.

The extension 85 is receivable between, and is engageable with the opposing surfaces of, a pair of adjacent teeth 87 on the gear 27, preferably at the point where the pitch circle 88 (Figure 7) intersects such surfaces. However, so long as the extensions 85 on the several engaging heads 79, shown in Figure 1, all engage respective surfaces on adjacent teeth 87 substantially uniformly, the end result will be automatically accomplished, as will be seen hereinafter.

The gear engaging elements 26 are arranged and constructed so that the structure providing the radial surfaces 73 and 74 will provide the major part of the backing for the engaging heads 79 when the gear 27 is engaged, and firmly held, by said elements 26, as appearing in Figure 1. The anchor bolts and nuts are provided primarily to fix the position of the extension 85 and prevent its accidental movement out of alignment with a preselected position thereof, which is accomplished in a manner discussed in detail hereinafter. It will be observed that, because the radius of curvature of the arcuate surface 86 on the engaging head 79 is smaller than the radius of curvature on the radial surfaces 73 and 74, engagement of said surface 86 with one of the radial surfaces 73 or 74 will be in a relatively small zone which can be substantially directly aligned with the bolt opening 80 and the center line of the extension 85 on the head 79. Due to the fact that the radial surfaces 73 and 74 must, of necessity, have a fixed radius of curvature, the contact between the arcuate surface 86 and one of the radial surfaces 73 or 74 will be in exact alignment with said bolt opening 80 and extension 85 only when the said radial surface is at a radial distance from the center of the chuck 10 exactly equal to its radius of curvature. When the position of the radial surface moves inwardly or outwardly from such exact position, the point of contact will move out of alignment to one side or the other thereof. However, the distance will be so small that it will have no appreciable effect upon the accuracy of the chuck or upon its effectiveness of operation.

In order to assure proper alignment of the engaging heads 79 with the gear 27 which they support, an alignment tool 28 is advantageously provided. In this particular embodiment, said tool 28 is comprised of a pair of substantially parallel, elongated and spaced apart bars 91 and 92 (Figures 8 and 9), which are secured to each other at corresponding ends thereof by means of the post 93. The opposite or outer ends of said bars are releasably held with respect to each other by means of the screw 94, which is disposed near to, but spaced from, said outer ends. Said outer ends of the bars 91 and 92 are provided with flat, substantially parallel, opposing surfaces 95 and 96 adjacent to said outer ends, which are engageable with the side surfaces 97 and 98, respectively, of each of the engaging heads 79. Said side surfaces of the heads 79 are parallel with the center line of the extension 85 and, therefore, with a plane which bisects the angle between the wedging surfaces 100 and 101 on said extension 85. A guide cylinder 102, which is snugly and slidably disposable within the central opening 103 in the gear 27, has a portion of reduced diameter 104 slidably extendable between the bars 91 and 92. Said portion 104 is provided with a threaded, co-axial opening 105, into which a bolt 106 is threadedly receivable for securing a clamping plate 107, hence, the cylinder 102, with respect to the bars 91 and 92.

*Operation*

The operation of the universal chuck 10, as regards that portion thereof which effects the radial movement of the jaws 12 with respect to the chuck body 13, is substantially the same as set forth in detail in our above mentioned Patent No. 2,639,157. In effecting such operation, the spiral gear member 22 is rotated around the axis of the chuck body 13 and with respect to said chuck body 13, whereby the teeth 66 on the gear member engage the teeth 67 on the rear component 24 of each jaw 12.

Where it is desired to machine or grind the central opening of a gear 27 (Figure 1) having external teeth, the front component 23 is mounted upon the rear component 24 by means of the bolts 61 and 62, in either of the positions illustrated in Figures 4 and 5, depending upon the diameter of the particular gear to be machined. Gear engaging elements 26 are mounted upon the jaws 12, either all in the outer slots 75 or all in the inner slots 76, so that their extensions 85 point approximately toward the axis of rotation of the chuck 10. The gear 27 is then placed between the engaging heads 79 on said gear engaging elements 26, after which the chuck jaws 12 are moved toward the axis of the chuck 10 in a substantially conventional manner by the chuck jaw actuating mechanism, including the spiral gear member 22.

As said engaging heads 79 approach the periphery of the gear 27, probably at least two, and perhaps all three, of the anchor bolt and nut assemblies holding the heads 79 on the front component 23 will have to be loosened slightly in order to properly align the extensions 85 on each said head 79 with the space between a pair of adjacent gear teeth 87. In order to effect this alignment approximately, the engaging heads 79 are manually shifted laterally as needed lengthwise of their slots 75 or 76. The jaws 12 are then moved further radially inwardly while such manual adjustment of the engaging heads is continued. When the engagement between the heads 79 and the gear 27 is approximately effected and completed, the alignment tool 28 is then arranged upon the gear 27 so that its guide cylinder 102 extends into the opening 103 and the opposing end surfaces 95 and 96 on the bars 91 and 92 embrace the side surfaces 97 and 98 of a selected one of said heads 79. The screw 94 is then tightened, whereby said engaging head and the extension 85 thereof are accurately aligned with the center of the gear 27. The anchor bolt 81 is tightened, whereby such selected head 79 is held in its aligned position. The alignment tool 28 is then removed from said selected head 79 and used in the same manner to properly align the other two engaging heads 79. During such alignment, the jaws 12 are continuously urged toward the central axis of the chuck 10, thereby entirely removing any slack in the engagement between the gear 27 and the wedge-shaped extensions 85.

With the gear 27 thus snugly and properly held by the engaging heads 79, the pitch line 88 of the gear 27 will be accurately concentric with a circle defined by the radial outwardmost point on the arcuate surfaces 86 of the engaging heads 79. Now it is only necessary to center such circle on the rotational axis of the chuck. This is accomplished by adjusting the screws 39, which causes the chuck body 13 to be moved with respect to the spindle 36, hence with respect to the rotational axis of the chuck 10. The detailed manner in which such adjustment is accomplished is fully disclosed in our aforementioned patent. The existence of such centering can be accurately determined in a substantially conventional manner by an indicator, shown in broken lines at 108 in Figure 2, which engages the arcuate surfaces 86 of the engaging heads 79 as the chuck 10 is manually rotated about its axis. When the indicator 108 shows that it is engaged by the surfaces 86 at exactly the same point in space, the machine operation, such as the truing of the opening 103, may be carried out on the gear 27 by conventional tools and in a substantially conventional manner.

When the machining operation is completed, the gear 27 is quickly and easily removed from the chuck 10 simply by operating the jaw actuating mechanism thereof, which causes the jaws 12 to move radially outwardly away from said gear. If it is desired, as it often is, to immediately machine another substantially identical gear, such identical gear, or any number of such gears, may in succession be placed between the engaging heads 79, and gripped thereby simply by causing the jaw actuating mechanism of the chuck to move the jaws 12 inwardly into the position where said gear will be engaged by the heads 79. Inasmuch as the heads 79 have been properly centered with respect to the rotational axis of the chuck 10 by means of the adapter 11, additional gears will automatically be gripped by the heads 79 so that their pitch lines will be centered upon the rotational axis of the chuck. Accordingly, no further adjustment will normally be required during subsequent use of the chuck 10 with respect to further substantially identical gears.

*Alternate structure*

As shown in Figure 10, the above disclosed structure can be quickly and easily adapted for use, by slight modification, in truing the periphery 110 of a ring gear 33 with respect to the pitch line 111 thereof. The modified jaw 31 may be substantially identical to the jaw 12, except for the front component 112 thereof. The primary difference in said front component 112 resides in the fact that the radial backing surface 113 is disposed along the radially inner edge of the axial surface 114 on each jaw 31. Accordingly, the backing surfaces on the front component 112 are convex, whereas the radial backing surfaces 73 and 74 are concave. As in the case of said radial surfaces 73 and 74, the radial surface 113 advantageously has a radius of curvature approximately equal to its average radial distance from the rotational axis of the chuck 10.

The modified gear engaging element 32 (Figures 10 and 11) is provided with a gear engaging head 115 having a teeth engaging extension 116 on one side thereof and a relatively flat surface 117 on the opposite side thereof, which surface is preferably substantially perpendicular to the center line of the extension 116. A bolt opening 118 is provided with its axis aligned with the center line of the extension 116. An undercut, arcuate slot 119 is provided in the axial surface 114 substantially concentric with the radial backing surface 113 and spaced therefrom in substantially the same manner, and for substantially the same purpose, as disclosed and discussed hereinabove with respect to the slots 75 and 76. The bolt 121 and nut 122 provide the anchor means for the engaging head 115.

The engaging head 115, which has parallel side surfaces 123 and 124 substantially parallel with the center line of the extension 116, is aligned with respect to the ring gear 33 by means of an alignment tool 125 comprised of a pair of substantially parallel bars 126 and 127, which are connected together at their outer ends by the cross bar 128. The inner ends of said bars 126 and 127 are releasably held with respect to each other by the bolt 129. Said cross bar 128 is provided with a pair of engagement points 131 and 132, the inner ends of which lie in a single plane perpendicular to the lengthwise extent of the bars 126 and 127. Thus, when the alignment tool 125 is placed over the engaging head 115, so that the bars 126 and 127 engage the sides 123 and 124 of said head, and so that the points 131 and 132 engage the periphery 110 of the ring gear 33, the center line of the extension 116, the axis of the bolt opening 118, and the center of the flat surface 117 on the head 115 will be accurately aligned with the center of the ring gear 33 to the extent that the periphery 110 can be depended upon for locating such position.

In utilizing this modified structure, the chuck jaw 12 is converted to a jaw 31 by replacing the component 23 with a front component 112 (Figure 10), upon which the engaging head 115 is mounted with the teeth engaging extension 116 pointing radially outwardly. The approximate manual positioning of the engaging heads 115 is accomplished, while the jaws 31 are moved radially outwardly, in substantially the same manner as described in detail hereinabove with respect to the jaws 12 and engaging heads 79, the principal difference being that the jaws 31 and engaging heads 115 mounted thereon are moved outwardly to engage a ring gear, whereas the jaws 12 and engaging heads 79 are moved inwardly to engage an external gear.

The alignment tool 125 is utilized to produce the final, accurate alignment of the engaging head 115 with respect to the ring gear 33, whereby uniform engagement of the teeth of said ring gear by the several engaging heads 115 is insured. As in the case of the engaging heads 79, the engaging heads 115 are movable laterally of the front component 112 along the slot 119, in order to compensate where needed for the fact that the number of teeth in a gear is often not divisible by three. Thus, at least one, and probably two or more, of the engaging heads 115 must be adjusted along the slot 119 during the alignment of said heads by the alignment tool 125. When the final adjustments of the heads 115 are made, the pitch line of the ring gear 33 can then be centered upon the rotational axis of the chuck 10 by rotating said chuck and adjusting the adapter 11 until all of the flat surfaces 117 on said engaging heads 115 pass through a single point in space, as indicated by a conventional indicator means engageable with said flat surfaces 117. After the ring gear 33 is trued, it can be removed and replaced by a similar ring gear for similar treatment simply by moving the jaws 31 radially inwardly to release the gear and then moving them radially outwardly to effect engagement with another gear.

Whether the chuck 10 is equipped with jaws 12 or the modified jaws 31, and their corresponding gear engaging elements, the casing 16 and the cooperating shield plates 25 may be utilized for effecting a substantially totally enclosed gear actuating mechanism. Thus, contamination of, and interference with, the jaw actuating mechanism and other internal parts of the chuck by waste produced during its operation are virtually eliminated by the casing 16. Such protection is particularly important in chucking operations where very close tolerances must be held and where the effect of the mounting adapter 11, which is provided for the purpose of effecting such accuracy, would otherwise be nullified.

Although particular, preferred embodiments of the invention have been disclosed hereinabove for illustrated purposes, it will be understood that variations or modifications thereof, which do not depart from the scope of such disclosure, are fully contemplated unless specifically stated to the contrary in the appended claims.

We claim:

1. A gear chuck, comprising: a chuck body; a plurality of chuck jaws mounted on said chuck body for radial movement with respect thereto, said jaws each having transversely extending slot means therein; a gear engaging head mounted on each jaw; means extending through said slot means for releasably fixedly securing each said head to its associated jaw so that said head is normally stationary, but is adjustable transversely, with respect thereto; said head having a single, radially extending tapered portion receivable between adjacent teeth on a gear; and cooperating means on said jaw and said head for exerting a radially directed force on said head directed midway between said adjacent teeth when the said jaw is urged radially with respect to the gear, regardless of the transverse position of said gear engaging head in said slot means.

2. A gear chuck, comprising: a chuck body; a plurality of chuck jaws mounted on said chuck body for radial movement with respect thereto, said jaws each having transversely extending slot means therein; a gear engaging head mounted on each jaw; means extending through said slot means for releasably fixedly securing each said head to its associated jaw so that said head is normally stationary, but is adjustable transversely, with respect thereto; said head having a single, radially extending, tapered portion receivable between adjacent teeth on a gear; said chuck jaw having an axially extending arcuate surface, said gear engaging head having an axially extending arcuate surface with a different radius of curvature than said chuck jaw surface and contacting said chuck jaw surface, substantially with a line contact so that said chuck jaw surface exerts a radially directed force on said gear engaging head directed midway between said adjacent teeth when said jaw is urged radially with respect to the gear regardless of the transverse position of said gear engaging head in said slot means.

3. A gear chuck, comprising: a chuck body; a plurality of chuck jaws mounted on said chuck body for radial movement with respect thereto, said jaws each having a plurality of radially spaced, circumferentially extending arcuate slots therein; a gear engaging head mounted on each jaw; a single fastening means extending through one of said slots on each jaw for releasably fixedly securing said head to its associated jaw so that said head is normally stationary, but is adjustable circumferentially and is pivotable, with respect thereto; said head having a single, radially extending, tapered portion receivable between adjacent teeth on a gear; said chuck jaw having an axially extending arcuate surface concentric with the axis of said chuck body, said gear engaging head having an axially extending arcuate surface contacting said chuck jaw surface, said gear engaging head surface being co-axial with said chuck body and having a different radius of curvature than said chuck jaw surface so that said gear engaging head surface contacts said chuck jaw surface substantially with a line contact whereby said jaw exerts a radially directed force on said head directed midway between adjacent teeth when said jaw is urged radially with respect to the gear regardless of the transverse position of said gear engaging head in said slot.

4. A gear chuck, comprising: a chuck body; a plurality of chuck jaws mounted on said chuck body for radial movement with respect thereto, said jaws each having transversely extending slot means therein; a gear engaging head mounted on each jaw; means extending through said slot means for releasably fixedly securing each said head to its associated jaw so that said head is normally stationary, but is adjustable transversely, with respect thereto; said head having a single, radially extending portion having oppositely facing tapered surfaces thereon receivable against oppositely facing tooth surfaces of a gear; and cooperating means on said jaw and said head for exerting a radially directed force on said head directed midway between said adjacent teeth when the said jaw is urged radially with respect to the gear, regardless of the transverse position of said gear engaging head in said slot means.

References Cited in the file of this patent

UNITED STATES PATENTS

| | | |
|---|---|---|
| 1,837,312 | Arms | Dec. 22, 1931 |
| 2,277,613 | Swenson | Mar. 24, 1942 |
| 2,376,594 | Hite | May 22, 1945 |
| 2,543,117 | Mackmann | Feb. 27, 1951 |
| 2,639,157 | Buck et al. | May 19, 1953 |
| 2,678,824 | Parker et al. | May 18, 1954 |
| 2,758,843 | Coulson | Aug. 14, 1956 |
| 2,793,042 | Candee et al. | May 21, 1957 |